(12) United States Patent
Takata

(10) Patent No.: US 11,189,845 B2
(45) Date of Patent: Nov. 30, 2021

(54) METHOD AND DEVICE FOR PRODUCING FUEL CELL SEPARATOR

(71) Applicant: TOYOTA JIDOSHA KABUSHIKI KAISHA, Toyota (JP)

(72) Inventor: Satoshi Takata, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 128 days.

(21) Appl. No.: 16/408,566

(22) Filed: May 10, 2019

(65) Prior Publication Data

US 2019/0355997 A1 Nov. 21, 2019

(30) Foreign Application Priority Data

May 18, 2018 (JP) .............................. JP2018-096180

(51) Int. Cl.
| | | |
|---|---|---|
| H01M 8/021 | (2016.01) | |
| H01M 8/0228 | (2016.01) | |
| C23C 8/26 | (2006.01) | |
| C23C 4/134 | (2016.01) | |
| C23C 8/38 | (2006.01) | |

(52) U.S. Cl.
CPC ............. *H01M 8/021* (2013.01); *C23C 4/134* (2016.01); *C23C 8/26* (2013.01); *C23C 8/38* (2013.01); *H01M 8/0228* (2013.01)

(58) Field of Classification Search
CPC .. C23C 4/02; C23C 4/11; C23C 4/134; C23C 8/26; C23C 8/38; C23C 8/80; H01M 8/021; H01M 8/0228; Y02E 60/50; Y02P 70/50

See application file for complete search history.

(56) References Cited

FOREIGN PATENT DOCUMENTS

| JP | 08-201578 A | | 8/1996 | |
|---|---|---|---|---|
| JP | 08201578 A | * | 8/1996 | |
| JP | 09-324253 A | | 12/1997 | |
| JP | 2002-134128 A | | 5/2002 | |
| JP | 3980166 B2 | * | 9/2007 | ............ H01M 8/021 |
| JP | 3980166 B2 | | 9/2007 | |
| JP | 5580444 B2 | | 8/2014 | |
| JP | 2015-161011 A | | 9/2015 | |
| JP | 2015161011 A | * | 9/2015 | |

* cited by examiner

*Primary Examiner* — Jenny R Wu
(74) *Attorney, Agent, or Firm* — Sughrue Mion, PLLC

(57) ABSTRACT

The present disclosure relates to a method for producing a fuel cell separator, including: a preparation step of preparing a metallic base material having a passive film on at least one part of a surface thereof; and a titanium oxide film formation step of subjecting the surface of the metallic base material to atmospheric pressure plasma treatment using first spraying means for spraying a titanium-containing starting material solution together with argon gas under a 85% to 92.5% by volume nitrogen atmosphere in a chamber. The present disclosure also relates to a device for producing a fuel cell separator having: conveying means for conveying a metallic base material having a passive film on at least one part of a surface thereof; a treatment chamber in which the metallic base material conveyed by the conveying means is disposed so as to be capable of passing therein under a 85% to 92.5% by volume nitrogen atmosphere; and first spraying means for spraying a titanium-containing starting material solution together with argon gas to carry out atmospheric pressure plasma treatment, which is disposed in the passage direction of the metallic base material in the treatment chamber.

4 Claims, 3 Drawing Sheets

METHOD AND DEVICE FOR PRODUCING FUEL CELL SEPARATOR

CROSS REFERENCE TO RELATED APPLICATIONS

The present application claims priority from Japanese patent application JP 2018-096180 filed on May 18, 2018, the content of which is hereby incorporated by reference into this application.

BACKGROUND

Technical Field

The present disclosure relates to a method and a device for producing a fuel cell separator.

Background Art

A fuel cell electrochemically reacts hydrogen and oxygen to generate an electromotive force. In principle, water is the only product produced by fuel cell power generation. Therefore, fuel cells are drawing attention as a clean power generation system with little burden on the global environment.

A fuel cell is configured with a membrane electrode assembly (hereinafter referred to as "MEA") as a basic unit, in which an electrode catalyst layer is disposed on both sides of an electrolyte membrane. During the operation of the fuel cell, by supplying a fuel gas containing hydrogen to an electrode catalyst layer on the anode (fuel electrode) side, and an oxidation gas containing oxygen to an electrode catalyst layer on the cathode (air electrode) side, respectively, thereby generating an electromotive force. An oxidation reaction proceeds at the anode and a reduction reaction proceeds at the cathode. Accordingly, an electromotive force is supplied to an external circuit.

In a fuel cell, usually, a gas diffusion layer is disposed outside respective electrode catalyst layers of MEAs, and a separator is further placed outside the gas diffusion layer such that a fuel cell is composed thereof. Usually, fuel cells are used as a combination of a plurality of fuel cells (hereinafter referred to as "fuel cell stack") required on the basis of desired electric power.

The fuel cell separator may come into contact with water generated by the reaction in each fuel cell and hydrogen ions ($H^+$) responsible for charge transfer. For such reason, a fuel cell separator needs to have high conductivity and corrosion resistance. Therefore, as a fuel cell separator, usually carbon or a metallic material is used. As a metal material having excellent corrosion resistance, stainless steel can be mentioned. However, since stainless steel normally has a passive film on its surface, it has low conductivity. Therefore, techniques for improving conductivity and corrosion resistance of the surface of stainless steel have been developed.

For example, JP H9-324253 (1997) A discloses a method for improving corrosion protection of a structural material (X), comprising thermally spraying a material obtained by adding a pentavalent element such as Nb to $TiO_2$ to yield 0.01% to 0.2% by weight, which is used as a thermal spraying material, on one surface of the structural material by a plasma thermal spraying or atmospheric pressure plasma spraying method, thereby forming a film. The literature teaches that stainless steel can be used as the structural material X. The literature also teaches that a thermal spraying material in the mist form is supplied to plasma generating means to form a plasma flow, and thermal spraying is carried out to attach the plasma flow to the surface of the structural material X in the air, thereby forming a titanium oxide semiconductor layer Y.

JP 2015-161011 A discloses a high nitrogen solid solution stainless steel, which is formed by solid-dissolving nitrogen at a high concentration via plasma nitridation on the surface of stainless steel so as to form a nitrided layer by phase transformation on the surface.

JP Patent No. 3980166 discloses a low temperature-type fuel cell separator, which is produced by forming a coating layer of conductive titanium oxide mainly consisting of $TiO_2$ on the surface of a base material which is an austenitic stainless steel composed of predetermined components or austenitic/ferritic stainless steel composed of predetermined components, in which the coating layer contains impurities for imparting conductivity, and its volume resistivity is adjusted to be not more than $10^2$ Ω·m.

For example, JP 2002-134128 A discloses, as a technique for producing a fuel cell separator by removing passive film on the surface of stainless steel, a surface treatment method of a passive metal surface for lowering contact resistance against carbon, comprising polishing a passive metal with a polishing agent coated with a noble metal, thereby allowing the noble metal to attach to the surface of stainless steel immediately after removing a surface oxide film.

JP Patent No. 5580444 discloses a method for producing a fuel cell separator, comprising a press forming step of forming a metal material plate into a product having a concave-convex cross-section and a plating step of plating a conductive metal only on the convex portions of the material plate having a concave-convex cross-section, wherein the plating step is carried out by bringing a plating solution holding material holding a plating solution containing ions of the conductive metal into contact only with the convex portions and setting a current density to a predetermined level between the plating solution holding material and the material plate (an average current density of 5 to 26 $A/dm^2$ is excluded), and hydrogen is generated on the surface of the material plate, thereby plating the conductive metal on the material plate while reducing a passive film formed on the surface of the material plate by generated hydrogen.

In addition, regarding stainless steel surface treatment technology, for example, JP H8-201578 (1996) A discloses a structural material for a nuclear reactor, which is disposed inside of reactor cooling water (R), and in which a titanium oxide semiconductor layer (Y) having an oxygen defect structure is placed on the surface of a structural material (X) to be exposed to a synchrotron radiation atmosphere. The literature teaches that SUS304 stainless steel can be used as the structural material X.

SUMMARY

As described above, techniques for improving conductivity and corrosion resistance of the surface of a metallic base material such as stainless steel having excellent corrosion resistance are known. However, there are several problems in these techniques. For example, in a case in which a titanium oxide film is formed on the surface of stainless steel in the air as in the case of the method disclosed in JP H9-324253 (1997) A, the conductivity of the obtained material is low. This is because a passive film (naturally oxidized film) exists between the formed titanium oxide film and stainless steel. In order to solve such problem, a technique for forming a conductive film after removing a passive film on the surface of a metallic base material is known (e.g., JP 2002-134128 A and JP Patent No. 5580444). However, even after the passive film on the surface of the metallic base material is removed, the surface of the metallic base material is naturally oxidized, which may allow a passive film to be formed again before a conductive film is formed. Accordingly, there is a problem that sufficient conductivity cannot be obtained even by removing the passive film on the surface of the metallic base material.

Therefore, the present disclosure provides means for improving conductivity on a surface of a metallic base material which can be used as a separator for a fuel cell, while substantially preventing the formation of a passive film on the surface of the metallic base material due to natural oxidation.

A variety of means for solving the above problems have been examined. The present disclosure is based on the finding that it is possible to subject a surface of a metallic base material to atmospheric pressure plasma treatment with a titanium-containing starting material solution under an atmosphere containing nitrogen at a certain concentration in a chamber, thereby obtaining a metallic base material having a surface coating with conductivity greater than that of a metallic base material obtained by atmospheric pressure plasma treatment in the air. The present disclosure is also based on the finding that the metallic base material having a surface coating obtained by the above method is excellent in adhesion of the surface coating. The present disclosure has been completed based on the above findings.

Specifically, the present disclosure encompasses the following aspects and embodiments.

(1) A method for producing a fuel cell separator, comprising:

a preparation step of preparing a metallic base material having a passive film on at least one part of a surface thereof; and a titanium oxide film formation step of subjecting the surface of the metallic base material to atmospheric pressure plasma treatment using first spraying means for spraying a titanium-containing starting material solution together with argon gas under an atmosphere of 85% to 92.5% by volume nitrogen in a chamber.

(2) The method according to claim 1, further comprising, prior to the titanium oxide film formation step, a nitridation step of subjecting the surface of the metallic base material to atmospheric pressure plasma treatment using second spraying means for spraying nitrogen gas in a chamber in which the first spraying means is used, thereby nitriding the passive film of at least one part of the surface of the metallic base material.

(3) The method according to the embodiment (1) or (2) above, wherein the metallic base material is stainless steel.

(4) The method according to any one of the embodiments (1) to (3) above, wherein the titanium-containing starting material solution contains a trivalent titanium compound.

(5) A device for producing a fuel cell separator, comprising:

conveying means for conveying a metallic base material having a passive film on at least one part of a surface thereof;

a treatment chamber filled with an atmosphere of 85% to 92.5% by volume nitrogen, in which the metallic base material to be conveyed by the conveying means is disposed so as to be capable of passing therein; and first spraying means for spraying a titanium-containing starting material solution together with argon gas to carry out atmospheric pressure plasma treatment, which is disposed in the direction of passage of the metallic base material in the treatment chamber.

(6) The device according to the embodiment (5) above, further having second spraying means for spraying nitrogen gas to carry out atmospheric pressure plasma treatment, which is disposed in front of the first spraying means in the direction of passage of the metallic base material in the treatment chamber.

(7) The device according to the embodiment (5) or (6) above, wherein the metallic base material is stainless steel.

(8) The device according to any one of the embodiments (5) to (7) above, wherein the titanium-containing starting material solution contains a trivalent titanium compound.

According to the present disclosure, it becomes possible to provide means for improving conductivity on a surface of a metallic base material that can be used as a fuel cell separator while preventing the formation of a passive film on the surface of the metallic base material due to natural oxidation.

DETAILED DESCRIPTION

Figure 1:
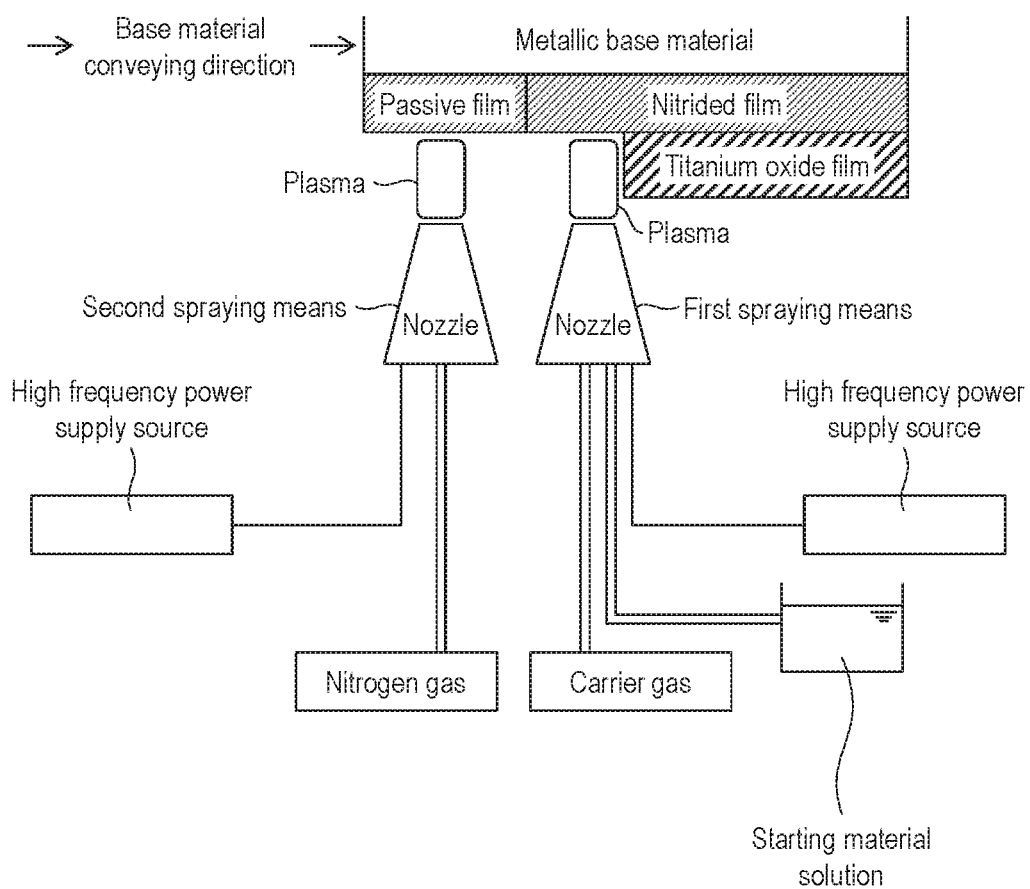
FIG. 1 schematically illustrates one embodiment of the method for producing a fuel cell separator in one aspect of the present disclosure.

Some embodiments of the present disclosure will be described in detail below.

<1. Method for Producing Fuel Cell Separator>

One aspect of the present disclosure relates to a method for producing a fuel cell separator. The method in this aspect includes a preparation step, a titanium oxide film formation step, and optionally a nitridation step.

[1-1. Preparation Step]

The method in this aspect includes: a preparation step of preparing a metallic base material having a passive film on at least one part of a surface thereof.

A metallic base material having a passive film on a surface thereof prepared in this step can be appropriately selected from among a variety of materials that can be usually used as fuel cell separator materials in the art. Examples of such materials include, but are not limited to, stainless steel (e.g., SUS447). In some embodiments, a metallic base material has a plate-like shape. Among the materials exemplified above, stainless steel is less expensive than titanium or the like. In addition, stainless steel has higher corrosion resistance than aluminum or the like. The materials exemplified above have a passive film of a metal oxide on at least one part of its surface. Therefore, in a case in which any one of the exemplified materials is used for a fuel cell separator, it can exhibit high corrosion resistance in the use environment of fuel cells.

[1-2. Titanium Oxide Film Formation Step]

The method in this aspect includes a titanium oxide film formation step of subjecting a surface of a metallic base material to atmospheric pressure plasma treatment using first spraying means for spraying a titanium-containing starting material solution together with a carrier gas under an atmosphere containing nitrogen at a certain concentration in a chamber.

A metallic base material used in this step is usually prepared in the preparation step described above. In a case in which a metallic base material used in this step is any one of those exemplified above (e.g., stainless steel), it has a passive film of a metal oxide on at least one part of its surface. Therefore, at least one part of the surface of a metallic base material used in this step is allowed to become conductive prior to or during the step in some embodiments. Examples of means for allowing at least one part of a surface of a metallic base material to become conductive include, but are not limited to, nitridation of a passive film. A passive film on at least one part of a surface of a metallic base material is nitrided in the nitridation step described below prior to this step in some embodiments. It is possible to improve conductivity of a surface of a metallic base material by allowing at least one part of a surface of a metallic base material used in this step to become conductive using the above means prior to or during the step.

The present disclosure is based on the finding that by subjecting a surface of a metallic base material to atmospheric pressure plasma treatment with a titanium-containing starting material solution under an atmosphere at a nitrogen concentration not less than the nitrogen concentration in the air (approximately 78% by volume) in a chamber, it is possible to obtain a metallic base material having a surface coating with conductivity greater than that of a metallic base material obtained by similar atmospheric pressure plasma treatment in the air in a chamber. In this step, the nitrogen atmosphere in a chamber for subjecting a surface of a metallic base material to atmospheric pressure plasma treatment using the first spraying means is within a range of 85% to 92.5% by volume, 85% to 90% by volume in some embodiments, and approximately 85% by volume in some other embodiments. In a case in which the nitrogen atmosphere in a chamber for atmospheric pressure plasma treatment is below the lower limit, the conductivity on the surface of the resulting metallic base material might decline. In addition, the nitrogen atmosphere in a chamber for atmospheric pressure plasma treatment is above the upper limit, the adhesion of a coating on the surface of the resulting metallic base material might decline as described below. Therefore, it is possible to improve conductivity on the surface of the metallic base material and also improve adhesion of the coating on the surface by carrying out this step under the atmosphere containing nitrogen within the above range in a chamber.

In individual aspects of the present disclosure, it is possible to measure conductivity on a surface of a metallic base material by determining contact resistance of the metallic base material by the following procedures, although the present disclosure is not limited thereto. A gold-plated copper plate is layered on the film-formed surface of the metallic base material obtained in the titanium oxide film formation step. Carbon paper is sandwiched between the metallic base material and the copper plate. A constant current is applied between the metallic base material and the copper plate while applying a predetermined pressure (e.g., approximately 0.98 MPa) from the upper side. At such time, the voltage value between the titanium oxide film on the surface of the metallic base material and the carbon paper is measured. The contact resistance value ($m\Omega \cdot cm^2$) is calculated based on the obtained voltage value and the applied current value.

In individual aspects of the present disclosure, adhesion of the coating on the surface of the metallic base material can be measured by, for example, the stud pull test, although the present is not limited thereto.

A variety of devices usually used for atmospheric pressure plasma treatment can be applied to the first spraying means used in this step. Since atmospheric pressure plasma treatment is performed under the atmospheric pressure in a treatment chamber, the treatment can be performed by an inexpensive device. Meanwhile, in a case in which a film is formed on a surface of a metallic base material by another coating formation treatment, for example, the ion sputtering method or aerosol deposition method, since film formation is performed in vacuum, an expensive vacuum device is necessary. In addition, atmospheric pressure plasma treatment is performed without heating a metallic base material. Meanwhile, in a case in which a film is formed on a surface of a metallic base material by another coating formation treatment, for example, the ion sputtering method, chemical vapor deposition (CVD) method, or sol-gel method, it is necessary to heat the metallic base material. When a metallic base material is heated, a passive film might be formed on the surface thereof due to natural oxidation. Therefore, by carrying out this step by atmospheric pressure plasma treatment, a coating can be formed on the surface of a metallic base material in a less expensive manner as compared with other types of coating formation treatment.

A variety of devices usually used for atmospheric pressure plasma treatment can be applied to the first spraying means used in this step. The first spraying means is carried out by a remote-type atmospheric pressure plasma device in some embodiments. In the case of a remote-type atmospheric pressure plasma device, a coating is formed on a surface of a metallic base material by bringing active species generated in a discharge space into contact with the surface of the metallic base material. Accordingly, it is possible to substantially prevent the plasma having large energy from being in contact with the metallic base material. It is therefore possible to substantially reduce a damage of the metallic base material and the formed coating by carrying out this step using the first spraying means in the remote-type device.

In this step, by subjecting a surface of a metallic base material to atmospheric pressure plasma treatment with a titanium-containing starting material solution, a film containing titanium oxide is formed on the surface of the metallic base material. Such titanium oxide film can exhibit conductivity because of its oxygen defects. In addition, titanium oxide is less expensive than other materials such as gold and tin oxide, which may exhibit conductivity. It is therefore possible to form a less-expensive titanium oxide film having conductivity on a surface of a metallic base material by carrying out this step.

A titanium-containing starting material solution used in this step contains a trivalent titanium compound in some embodiments. It contains an inorganic trivalent titanium compound such as titanium trichloride ($TiCl_3$) in some embodiments, and it contains $TiCl_3$ in some other embodiments. In addition, the titanium-containing starting material solution is an aqueous solution containing one or more trivalent titanium compounds described above in some embodiments. As trivalent titanium has oxygen defects, a film containing titanium oxide formed with a trivalent titanium compound can exhibit conductivity because of its oxygen defects. Among trivalent titanium compounds, an organic compound can be formed as a by-product from an organic trivalent titanium compound after ionization by atmospheric pressure plasma treatment. When such an organic compound is mixed in a film containing titanium oxide, there is a possibility that the conductivity on the surface of the resulting metallic base material declines. In addition, in a case in which a starting material solution containing a tetravalent titanium compound (e.g., titanium tetrachloride) is used, there is a possibility that the conductivity on the surface of the resulting metallic base material declines, compared with a case in which a starting material solution containing a trivalent titanium compound is used based on the difference in oxygen defects. Therefore, in a case in which a starting material solution containing a tetravalent titanium compound (e.g., titanium tetrachloride) is used, in order to reduce tetravalent titanium into trivalent titanium, it is necessary to use a reducing gas such as hydrogen as a carrier gas for the first spraying means. In a case in which such reducing gas is used, it is necessary to carry out this step in a highly airtight chamber. Therefore, by carrying out this step using a starting material solution containing any of the trivalent titanium compounds described above, it is possible to form a titanium oxide film having conductivity on the surface of a metallic base material under simple conditions.

The carrier gas used in this step is argon gas. In a case in which a reducing gas such as hydrogen is used as a carrier gas, it is necessary to carry out this step in a highly airtight chamber. Therefore, by carrying out this step using argon gas, it is possible to form a titanium oxide film having conductivity on the surface of a metallic base material under simple conditions.

[1-3. Nitridation Step]

The method in this aspect further includes a nitridation step of subjecting the surface of the metallic base material to atmospheric pressure plasma treatment using second spraying means for spraying nitrogen gas in a chamber in which the first spraying means is used, thereby nitriding the passive film of at least one part of the surface of the metallic base material prior to the titanium oxide film formation step in some embodiments.

In this step, the surface of the metallic base material is subjected to atmospheric pressure plasma treatment using the second spraying means for spraying nitrogen gas, thereby nitriding the passive film of at least one part of the surface of the metallic base material. It is possible to convert the passive film on at least one part of the surface of the metallic base material into a conductive nitrided film by nitridation.

As described above, at least one part of a surface of a metallic base material used in the titanium oxide film formation step is allowed to become conductive in some embodiments. The present disclosure is based on the finding that the surface of the metallic base material is subjected to atmospheric pressure plasma treatment using the second spraying means for spraying nitrogen gas in a chamber prior to the titanium oxide film formation step so as to nitride the passive film of at least one part of the surface of the metallic base material, and then, the titanium oxide film formation step is carried out, thereby making it possible to form a titanium oxide film having conductivity on the surface of the nitrided film while substantially preventing a passive film from being formed again due to natural oxidation of the conductive nitrided film. Accordingly, by carrying out this step prior to the titanium oxide film formation step to form a titanium oxide film on the surface of the nitrided film, a highly conductive metallic base material can be obtained.

In this step, the second spraying means for spraying nitrogen gas is used in a chamber in which the first spraying means is used. In other words, this step is carried out in a treatment chamber in which the titanium oxide film formation step is carried out in some embodiments. By carrying out this step under such conditions, it is possible to form a titanium oxide film having conductivity on the surface of the nitrided film in the titanium oxide film formation step while substantially preventing a passive film from being formed again due to natural oxidation of the conductive nitrided film. Accordingly, by carrying out this step and the titanium oxide film formation step under the above conditions to form a titanium oxide film on the surface of the nitrided film, a highly conductive metallic base material can be obtained.

In this step, as a result of nitridation of the surface of the metallic base material, oxygen atoms are substituted with nitrogen atoms in the metal oxide contained in the passive film on the surface of the metallic base material, thereby forming a metallic nitride. Here, as the nitrogen concentration in the nitridation chamber increases, the amount of the metallic nitride formed on the surface of the metallic base material increases. However, the metallic nitride has low binding affinity for titanium oxide formed in the titanium oxide film formation step. The present disclosure is based on the finding that when a surface of a metallic base material is nitrided under an atmosphere containing nitrogen at a concentration exceeding a predetermined nitrogen concentration in a chamber, the adhesion of the resulting titanium oxide film remarkably decreases as compared with the case of similar nitridation in the air in a chamber. In this step, the nitrogen atmosphere for subjecting a surface of a metallic base material to atmospheric pressure plasma treatment in a chamber using the second spraying means for spraying nitrogen gas is within a range of 85% to 92.5% by volume, 85% to 90% by volume in some embodiments, and approximately 85% by volume in some other embodiments. The nitrogen atmosphere for atmospheric pressure plasma treatment in a chamber is above the upper limit, the adhesion of the resulting coating on the surface of the metallic base material might decline. It is therefore possible to partially nitride the passive film on the surface of the metallic base material by carrying out this step under the aforementioned nitrogen atmosphere in a chamber. Accordingly, conductivity on the surface of the metallic base material can be improved, thereby improving adhesion of the coating on the surface.

A variety of devices usually used for atmospheric pressure plasma treatment can be applied to the second spraying means used in this step. The second spraying means is carried out by a direct-type atmospheric pressure plasma device in some embodiments. In the case of a direct-type atmospheric pressure plasma device, plasma having large energy generated in a discharge space can be brought into direct contact with a surface of a metallic base material. Accordingly, a passive film on the surface of the metallic base material can be quickly nitrided. It is therefore possible to promptly carry out this step by the second spraying means in this device.

The nitrogen gas used in this step may be either pure nitrogen gas or a mixed gas containing nitrogen and a different gas. In the case of a mixed gas, examples of a different gas include arbitrary gases such as oxygen and carbon dioxide. A mixed gas containing nitrogen and oxygen is used because it is inexpensive in some embodiments. In a case in which the mixed gas contains oxygen, when the oxygen concentration is high, there is a possibility that oxidation of a metallic base material progresses excessively. In a case in which air is supplied as a mixed gas containing nitrogen and oxygen by a compressor or the like for use, in order to prevent contamination by floating matter in the air, a filter is provided to a flow path for supplying a gas to the second spraying means in some embodiments. The concentration of nitrogen gas used in this step is the same as the nitrogen concentration in the chamber in which the titanium oxide film formation step and the nitridation step are carried out in some embodiments. It is possible to adjust the nitrogen concentration in a chamber in which the titanium oxide film formation step and the nitridation step are carried out using nitrogen gas at the above concentration.

FIG. 1 schematically illustrates one embodiment of the method for producing a fuel cell separator in one aspect of the present disclosure. As depicted in FIG. 1, the method in this aspect is usually carried out in a treatment chamber in which a first atmospheric pressure plasma device having first spraying means for spraying a titanium-containing starting material solution together with a carrier gas. A metallic base material is disposed in a treatment chamber so as to be capable of passing therein. A second atmospheric pressure plasma device having second spraying means for spraying nitrogen gas is disposed in the treatment chamber in some embodiments. In this embodiment, the first spraying means and second spraying means are disposed along with a metallic base material that has been disposed so as to be capable of passing in a manner such that the first spraying means is disposed behind the second spraying means in the passage direction of the metallic base material. A high frequency power supply source is connected to the first spraying means, and a flow path for supplying a titanium-containing starting material solution and a flow path supplying a carrier gas are separately connected thereto in some embodiments. A high frequency power supply source is connected to the second spraying means, and a flow path for supplying nitrogen gas is connected thereto in some embodiments. The nitrogen gas can be used for adjusting the nitrogen concentration in the treatment chamber. In such case, the nitrogen gas is a mixed gas containing nitrogen at a concentration the same as the nitrogen concentration in the treatment chamber and a different gas (e.g., oxygen) in some embodiments.

A metallic base material prepared in the preparation step is conveyed at a certain speed in a certain direction in the treatment chamber. The treatment chamber is adjusted to be filled with an atmosphere containing nitrogen at a certain concentration using nitrogen gas sprayed by the second spraying means in some embodiments. Here, the surface of the metallic base material is subjected to atmospheric pressure plasma treatment by the second spraying means disposed along with the metallic base material that has been disposed so as to be capable of passing, thereby nitriding the passive film of at least one part of the surface of the metallic base material (nitridation step). This makes it possible to convert the passive film of at least one part of the surface of the metallic base material into a conductive nitrided film. Next, the surface of the metallic base material is subjected to atmospheric pressure plasma treatment by the first spraying means that has been disposed behind the second spraying means in the passage direction of the metallic base material (titanium oxide film formation step). This allows a conductive titanium oxide film to be formed on the surface of the nitrided film formed in the nitridation step.

According to the method in this aspect, it is possible to obtain a metallic base material having a nitrided film on at least one part of the surface thereof and a titanium oxide film on the surface of the nitrided film. A metallic base material obtained by the method in this aspect has high levels of conductivity and adhesion of a titanium oxide film. Therefore, it can be used for fuel cell separators in some embodiments. According to the method in this aspect, a fuel cell separator having high levels of conductivity and adhesion of a titanium oxide film can be produced.

<2. Device for Producing Fuel Cell Separator>

One aspect of the present disclosure relates to a device for producing a fuel cell separator having: conveying means for conveying a metallic base material having a passive film on at least one part of a surface thereof; a treatment chamber in which the metallic base material conveyed by the conveying means is disposed so as to be capable of passing therein under a certain nitrogen atmosphere; and first spraying means for spraying a titanium-containing starting material solution together with a carrier gas to carry out atmospheric pressure plasma treatment, which is disposed in the passage direction of the metallic base material in the treatment chamber. The device in this aspect can be used for carrying out the method for producing a fuel cell separator in one aspect of the present disclosure in some embodiments.

The device in this aspect further has second spraying means for spraying nitrogen gas to carry out atmospheric pressure plasma treatment, which is disposed in front of the first spraying means in the passage direction of the metallic base material in the treatment chamber, in some embodiments. In other words, the first spraying means and the second spraying means in the device in this aspect are disposed as separate means (e.g., different atmospheric pressure plasma devices). The above arrangement makes it possible to form a titanium oxide film having conductivity on a surface of a nitrided film in the titanium oxide film formation step while substantially preventing a passive film from being formed again due to natural oxidation of the conductive nitrided film which has been transformed from the passive film by the first spraying means. Meanwhile, in a case in which the first spraying means and the second spraying means are provided as the same means (e.g., a single atmospheric pressure plasma device), it is necessary to supply nitrogen gas for nitridation and both a titanium-containing starting material solution and argon gas for titanium oxide film formation alternately to the means, thereby carrying out atmospheric pressure plasma treatment. In such a case, when the active species is switched, the plasma state becomes unstable, which might result in insufficient activation of the active species. In addition, in order to obtain a desired product by forming a titanium oxide film on the surface of a nitrided film formed via nitridation of the passive film, it is necessary to precisely control switching of active species and the conveying speed of the metallic base material by the conveying means. Accordingly, by providing the first spraying means and the second spraying means as separate means, it is possible to form a titanium oxide film on the surface of the nitrided film, thereby obtaining a highly conductive metallic base material.

A metallic base material, a titanium-containing starting material solution, a carrier gas, and nitrogen gas which are used in the device in this aspect can be appropriately selected from among materials having the features described above.

Figure 2:
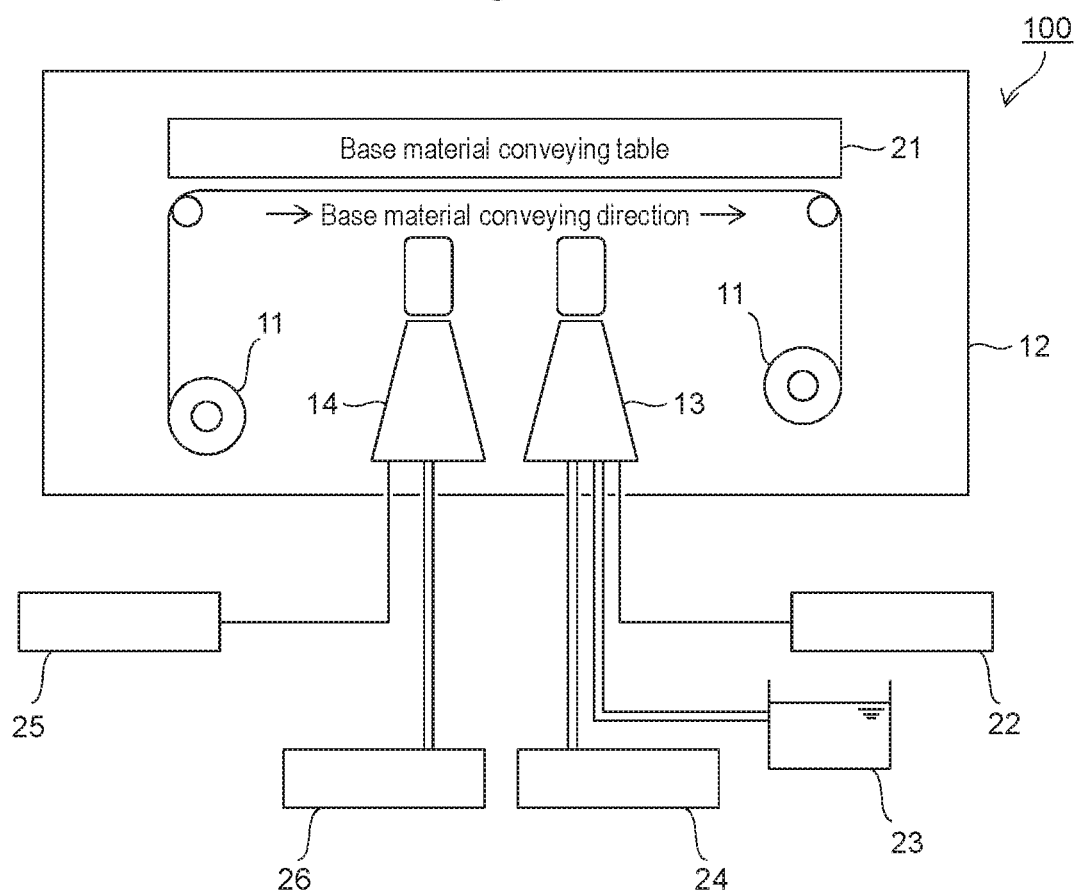
FIG. 2 schematically illustrates one embodiment of the device for producing a fuel cell separator in one aspect of the present disclosure.

FIG. 2 schematically illustrates one embodiment of the device for producing a fuel cell separator in this aspect. As depicted in FIG. 2, a device 100 in this aspect has: conveying means 11 for conveying a metallic base material having a passive film on at least one part of a surface thereof; a treatment chamber 12 in which the metallic base material conveyed by the conveying means 11 is disposed so as to be capable of passing therein; and first spraying means 13 for spraying a titanium-containing starting material solution 23 together with a carrier gas 24, which is disposed in the passage direction of the metallic base material in the treatment chamber 12. Second spraying means 14 for spraying nitrogen gas to carry out atmospheric pressure plasma treatment is disposed in the treatment chamber 12 in some embodiments. A base material conveying table 21 for conveying a metallic base material, a first atmospheric pressure plasma device having the first spraying means 13, and a second atmospheric pressure plasma device having the second spraying means 14 are disposed in in the treatment chamber 12 in some embodiments. In this embodiment, the first spraying means 13 and the second spraying means 14 are disposed along with the base material conveying table 21 in a manner such that the first spraying means 13 is disposed behind the second spraying means 14 in the passage direction of the metallic base material. For example, the conveying means 11 can be configured to draw a plate-like metallic base material from one coil to allow the base material to pass over the base material conveying table 21 at a certain speed so as to be wound by another coil. A high frequency power supply source 22 is connected to the first spraying means 13, and a flow path for supplying the titanium-containing starting material solution 23 and a flow path supplying the carrier gas 24 are separately connected thereto in some embodiments. The carrier gas 24 is supplied from a gas cylinder filled with a high-purity carrier gas in some embodiments. In such case, a flow path for supplying the carrier gas 24 can be connected to the gas cylinder. A high frequency power supply source 25 is connected to the second spraying means 14, and a flow path for supplying nitrogen gas 26 is connected thereto in some embodiments. The nitrogen gas 26 can be used for adjusting the nitrogen concentration in the treatment chamber 12. In such case, the nitrogen gas 26 is a mixed gas containing nitrogen at a concentration the same as the nitrogen concentration in the treatment chamber 12 and a different gas (e.g., oxygen) in some embodiments. The flow path for supplying a mixed gas of nitrogen and a different gas can be connected to a nitrogen gas cylinder and a different gas cylinder. It is possible to optionally provide a filter for removing floating matter or the like to a flow path for supplying the carrier gas 24 and a flow path for supplying the nitrogen gas 26.

The device in this aspect having the aforementioned features can be used for carrying out the method for producing a fuel cell separator in one aspect of the present disclosure. Accordingly, a fuel cell separator having high levels of conductivity and adhesion of a titanium oxide film can be produced by the device in this aspect.

EXAMPLES

Hereinafter, the present disclosure will be described in more detail by way of the Examples below. However, the scope of the present disclosure is not limited to these Examples.

<I: Production of Fuel Cell Separator>

A coil of plate-like stainless steel (SUS447 plate) having thickness of 0.1 mm was prepared as a metallic base material. A titanium trichloride ($TiCl_3$) aqueous solution was prepared as a titanium-containing starting material solution. A base material conveying table, a first atmospheric pressure plasma device having a first nozzle for spraying a titanium-containing starting material solution together with argon gas, and a second atmospheric pressure plasma device having a second nozzle for spraying nitrogen gas were disposed in a treatment chamber. A SUS447 plate was drawn from the coil and allowed to pass over the base material conveying table at a certain speed so as to be wound by another coil. A direct-type device was used as the first atmospheric pressure plasma device. A high frequency power supply source was connected to the first atmospheric pressure plasma device, and a flow path for supplying a titanium-containing starting material solution and a flow path supplying argon gas were separately connected thereto. The flow path for supplying argon gas was connected to an argon gas cylinder. A remote-type device was used as the second atmospheric pressure plasma device. A high frequency power supply source was connected to the second atmospheric pressure plasma device, and a flow path for supplying a mixed gas containing nitrogen and oxygen was connected thereto. The flow path for supplying a mixed gas containing nitrogen and oxygen was connected to a nitrogen gas cylinder and an oxygen gas cylinder. The nitrogen concentration (% by volume) in the mixed gas containing nitrogen and oxygen was adjusted by changing the gas supply pressure ratio therebetween. The first atmospheric pressure plasma device and the second atmospheric pressure plasma device were disposed along with the base material conveying table such that the second atmospheric pressure plasma device was disposed in front of the first atmospheric pressure plasma device in the passage direction of the SUS447 plate.

The nitrogen concentration in the treatment chamber was adjusted within a range of certain levels based on the volume mixing ratio of nitrogen and oxygen to be supplied to the second atmospheric pressure plasma device. High-frequency voltage was applied to the second atmospheric pressure plasma device, thereby generating plasma. The mixed gas of nitrogen and oxygen was sprayed from the second nozzle into plasma, thereby generating a plasma jet of the mixed gas. In addition, high-frequency voltage was applied to the first atmospheric pressure plasma device, thereby generating plasma. The $TiCl_3$ aqueous solution and argon gas were sprayed from the first nozzle into plasma, thereby generating a plasma jet of titanium and argon gas. The plasma jet of the mixed gas generated by the second atmospheric pressure plasma device was brought into contact with the SUS447 plate passing over the base material conveying table at a certain speed. Subsequently, the plasma jet of titanium and argon gas generated by the first atmospheric pressure plasma device was brought into contact therewith. The passive film on the surface of the SUS447 plate was nitrided by the plasma jet of the mixed gas generated by the second atmospheric pressure plasma device, thereby forming a nitrided film. Subsequently, a titanium oxide film was formed on the surface of the nitrided film by the plasma jet of titanium and argon gas generated by the first atmospheric pressure plasma device.

<II: Evaluation of Fuel Cell Separator>

The surface-coated SUS447 plate obtained in the manner described above was evaluated in terms of conductivity and adhesion in accordance with the following procedures.

[II-1. Evaluation of Conductivity]

Conductivity was evaluated by measuring contact resistance of material by the following procedures. A gold-plated copper plate was layered on the film formation side of the surface-coated SUS447 plate obtained in the manner described above. Carbon paper (TGP-H-120 manufactured by Toray Industries, Inc.) was sandwiched between both plate materials. A constant current was applied between the surface-coated SUS447 plate and the copper plate while applying a pressure of 0.98 MPa from the upper side. At such time, the voltage value between the titanium oxide film of the surface-coated SUS447 plate and carbon paper was measured. The contact resistance value ($m\Omega \cdot cm^2$) was calculated based on the obtained voltage value and the applied current value.

[II-2. Evaluation of Adhesion Force]

Adhesion force was evaluated by the stud pull test. Assuming that the measured value of adhesion force for the surface-coated SUS447 plate obtained in a 50% by volume nitrogen atmosphere in the treatment chamber was 1, a relative value of the measured value was calculated.

[II-3. Results]

Figure 3:
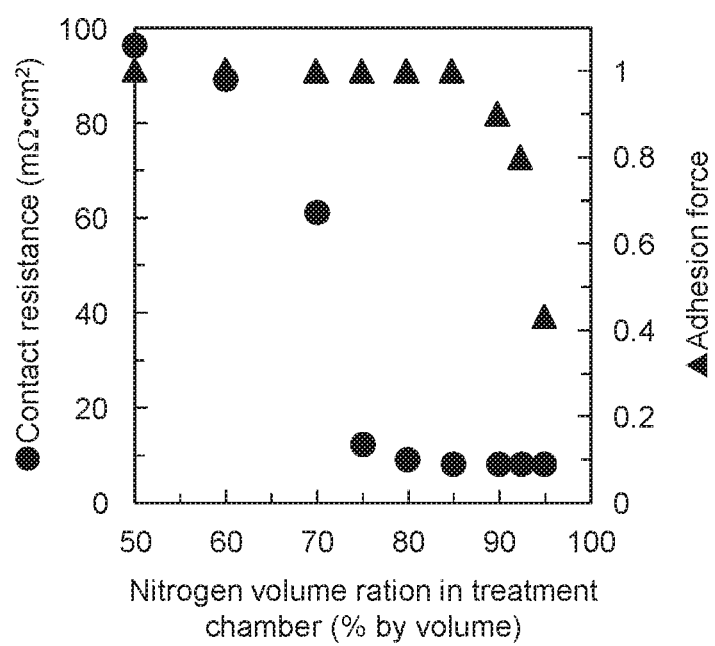
FIG. 3 is a graph comparing the relationship between the volume ratio of nitrogen in a treatment chamber during preparation of a surface-coated SUS447 plate and either contact resistance or adhesion measured by the procedures described above.

FIG. 3 depicts the relationship between the volume ratio of nitrogen in a treatment chamber during preparation of a surface-coated SUS447 plate and either contact resistance or adhesion measured by the procedures described above. In the figure, black circles for the left vertical axis indicate contact resistance values (m$\Omega \cdot$cm$^2$), and black triangles for the right vertical axis indicate adhesion force values (relative values).

As depicted in FIG. 3, it was revealed that high levels of conductivity and adhesion can be achieved at the same time by adjusting the nitrogen concentration in the treatment chamber within a range of 85% to 92.5% by volume based on the volume mixing ratio of nitrogen and oxygen supplied to the second nozzle. Meanwhile, when the nitrogen concentration in the atmosphere in the treatment chamber was less than 85% by volume, contact resistance increased while conductivity decreased. The results were probably because the nitrogen concentration in the treatment chamber was low, which resulted in insufficient nitridation of the passive film by the second atmospheric pressure plasma device. In addition, when the nitrogen atmosphere in the treatment chamber was above 92.5% by volume, adhesion remarkably declined. Under the above conditions, nitridation of the passive film could be sufficiently proceeded by the second atmospheric pressure plasma device. In such case, oxygen atoms of iron oxide could be substituted with nitrogen atoms over substantially the entire surface of the passive film, thereby forming iron nitride. However, iron nitride has a low level of binding affinity for titanium oxide generated by the first atmospheric pressure plasma device. For such reason, it was considered that when the nitrogen atmosphere in the treatment chamber was above 92.5% by volume, adhesion with the titanium oxide film declined.

DESCRIPTION OF SYMBOLS

11 Conveying means
12 Treatment chamber
13 First spraying means
14 Second spraying means
21 Base material conveying table
22, 25 High frequency power supply source
23 Titanium-containing starting material solution
24 Carrier gas
26 Nitrogen gas
100 Device for producing fuel cell separator

What is claimed is:

1. A method for producing a fuel cell separator, comprising:
    a preparation step of preparing a metallic base material having a passive film on at least one part of a surface thereof;
    a nitridation step of subjecting the surface of the metallic base material to atmospheric pressure plasma treatment using second spraying means for spraying nitrogen gas under a nitrogen atmosphere of 85% to 92.5% by volume in a chamber, thereby nitriding the passive film on at least one part of the surface of the metallic base material to obtain a nitrosated metallic base material; and
    a titanium oxide film formation step of subjecting the surface of the nitridated metallic base material to atmospheric pressure plasma treatment using first spraying means for spraying a titanium-containing starting material solution together with argon gas under an atmosphere of 85% to 92.5% by volume nitrogen in the chamber in which the second spraying means is used.

2. The method according to claim 1, wherein the metallic base material is stainless steel.

3. The method according to claim 1, wherein the titanium-containing starting material solution contains a trivalent titanium compound.

4. The method according to claim 1, wherein the nitrogen atmosphere in both the nitridation step and the titanium oxide film formation step is within a range of 85% to 90% by volume.

* * * * *